July 18, 1972 S. E. REISS 3,677,843

METHOD FOR FABRICATING MULTILAYER MAGNETIC DEVICES

Filed Feb. 2, 1970 2 Sheets-Sheet 1

STEFAN E. REISS
*INVENTOR.*

METHOD FOR FABRICATING MULTILAYER MAGNETIC DEVICES

Filed Feb. 2, 1970

STEFAN E. REISS
*INVENTOR.*

3,677,843
METHOD FOR FABRICATING MULTILAYER MAGNETIC DEVICES

Stefan E. Reiss, Watertown, Mass., assignor to Sylvania Electric Products Inc.
Filed Feb. 2, 1970, Ser. No. 7,575
Int. Cl. C23f *17/00;* H01f *41/14;* H05k *3/06*
U.S. Cl. 156—3 5 Claims

ABSTRACT OF THE DISCLOSURE

Method for fabricating multilayer magnetostatically-coupled thin-film magnetic memory devices. A plurality of layers are deposited in succession on a glass or quartz substrate. The layers include a first Permalloy magnetic film, a chromium barrier layer, a chromium-copper alloy conducting layer, a silicon monoxide smoothing layer, a second Permalloy magnetic film, a silicon monoxide protective layer, a chromium masking layer, and a photosensitive resistant material masking layer.

Openings delineating the boundaries of the desired magnetic memory devices are then formed in the masking layer of photosensitive resistant material. Selective etching materials are then used, in four successive etching operations, to initially form an opening in the chromium masking layer (first etching operation), followed by openings in the silicon monoxide protective layer, the second Permalloy magnetic film, the silicon monoxide smoothing layer, and the chromium-copper alloy conducting layer (second etching operation), an opening in the chromium barrier layer (third etching operation), and an opening in the first Permalloy magnetic film (fourth etching operation).

BACKGROUND OF THE INVENTION

The present invention relates to a method for fabricating thin-film magnetic devices and, more particularly, to a method for fabricating magnetostatically-coupled thin-film magnetic memory devices.

Magnetostatically-coupled thin-film magnetic memory devices, also commonly referred to as "coupled-film" or "closed-flux" devices, are well known to those skilled in the art. The advantages offered by magnetostatically-coupled thin-film magnetic devices, namely, smaller memory cell or device size, greater signal amplitudes, and higher packing density, are also well-known to those skilled in the art. One particularly suitable magnetostatically-coupled thin-film magnetic memory device is described in detail in a co-pending patent application of Dennis M. Franklin, Richard M. Hornreich, and Harvey Rubinstein, Ser. No. 886,515, filed Dec. 19, 1969, entitled "Magnetic Memory Devices," and assigned to the same assignee as the present application.

As disclosed in the above-cited application, the magnetostatically-coupled thin-film magnetic memory device comprises first and second magnetic films having a chromium-copper alloy conducting layer, for example, a write-sense conducting layer, and a smoothing layer therebetween. Although many different magnetic materials may be employed to form the first and second magnetic films and many different materials may be employed to form the smoothing layer, as explained in the above-cited application, experience and experimentation have indicated that a particularly satisfactory device can be produced by employing Permalloy material to form the first and second magnetic films and silicon monoxide to form the smoothing layer.

To produce magnetostatically-coupled thin-film magnetic memory devices such as the specific device briefly described above, a multilayer assembly is formed on a suitable substrate, for example, a glass or quartz substrate, by vacuum-depositing onto the substrate, in succession, a first layer of Permalloy material, a layer of chromium-copper alloy material, a layer of silicon monoxide smoothing material, and a second layer of Permalloy material. A layer of photosensitive resistant material for example, KMER photosensitive resistant material (Kodak Metal Etch Resist, a product of the Eastman Kodak Co., Rochester, N.Y.), or KTFR photosensitive resistant material (Kodak Thin Film Resist, also a product of the Eastman Kodak Co.), is then formed on the above-described multilayer assembly. Openings delineating the boundaries of the final magnetostatically-coupled thin-film magnetic memory devices are formed in the photosensitive resistant material by well-known photomasking procedures. The resulting assembly is then etched in a hydrofluoric acid-nitric acid etching solution to form successive aligned openings in the second (top) layer of Permalloy material, the layer of silicon monoxide material, the layer of chromium-copper alloy material, and the first (bottom) layer of Permalloy material. The layer of photosensitive resistant material may then be removed, as by a chemical stripper, or, as is more usually the case, left on the second (top) layer of Permalloy material to serve as protection against ambient environmental conditions.

Although magnetostatically-coupled thin-film magnetic memory devices fabricated in accordance with the above-described method are very satisfactory and perform well in operation, the fabrication method itself is not fully satisfactory due primarily to the inability of the photosensitive resistant material, whether of the KMER or KTFR type, to satisfactorily withstand attack by the hydrofluoric acid-nitric acid etching solution during the etching of openings in the various layers underlying the layer of photosensitive resistant material. More specifically, as the hydrofluoric acid-nitric acid etching solution acts to etch openings in the various layers underlying the layer of photosensitive resistant material, it also attacks the photosensitive resistant material, starting with the edge regions first, causing the photosensitive resistant material to break down chemically. In the case of photosensitive resistant material of the KMER type, the breakdown of the photosensitive resistant material occurs initially at the edge regions due to the generally poor edge definition of this type of photosensitive resistant material. In the case of photosensitive resistant material of the KTFR type, which has better edge definition than photosensitive resistant material of the KMER type, breakdown occurs initially at the edge regions due to the relatively poor chemical resistance of this type of photosensitive resistant material. As a result of the breakdown of the layer of photosensitive resistant material at the edge regions, the hydrofluoric acid-nitric acid etching solution attacks undesirably the portions of the top layer of Permalloy material in contact with these edge regions and causes some undercutting of the top layer of Permalloy material. To solve the above problem, it has been suggested to use higher baking temperatures after developing the photosensitive resistant material to render it more chemically resistant. However, the bake temperatures necessary to accomplish this result are greater than 100° C., the temperature at which degradation of the magnetic properties of the top and bottom layers of Permalloy material starts to take place.

In addition to the above problem, in those cases where it is desired to completely remove the layer of photosensitive resistant material, the chemical strippers commonly used for this purpose may also attack undesirably the top layer of Permalloy material. Also, as a minor quality control problem, the hydrofluoric acid-nitric acid etching solution, in addition to attacking the various layers underlying the layer of photosensitive resistant material to etch the desired openings therein, may also attack the glass or quartz substrate and roughen it to the point where it is difficult to measure accurately the thickness of the device formed on the substrate.

BRIEF SUMMARY OF THE INVENTION

Briefly, in accordance with the present invention, a method is provided for fabricating multilayer thin-film magnetic devices. In accordance with the method of the invention, a first layer of magnetic material is initially deposited on a substrate. In successive steps, a barrier layer is deposited on the first layer of magnetic material, a layer of conducting material is deposited on the barrier layer, a layer of smoothing material is deposited on the layer of conducting material, a second layer of magnetic material is deposited on the layer of smoothing material, a protective layer is deposited on the second layer of magnetic material, and a first masking layer is deposited on the protective layer. A second masking layer having an opening therein is then provided on the first masking layer.

The assembly produced in accordance with the above-described steps is then subjected to selective etching materials to form openings in the various layers to delineate the boundaries of multilayer thin-film magnetic devices in accordance with the invention. Initially, the assembly is subjected to etching material capable of etching the first masking layer but not the other layers of the assembly to form an opening in the first masking layer. The assembly is then subjected to etching material capable of etching the protective layer, the second layer of magnetic material, the layer of smoothing material, and the layer of conducting material, but not the barrier layer, to form openings in the protective layer, the second layer of magnetic material, the layer of smoothing material, and the layer of conducting material. Next, the assembly is subjected to etching material capable of etching the barrier layer but not the first layer of magnetic material, the layer of conducting material, the layer of smoothing material, the second layer of magnetic material, or the protective layer to form an opening in the barrier layer. As a final etching step, the assembly is subjected to etching material capable of etching the first layer of magnetic material but not the substrate, the barrier layer, the layer of conducting material, the layer of smoothing material, the protective layer, or the first masking layer to form an opening in the first layer of magnetic material. The devices remaining on the substrate as a result of forming the openings in the various layers as described above constitute the multilayer thin-film magnetic devices of the invention.

As will be described in detail hereinafter, if desired, subsequent to the last etching step described above the second masking layer may then be removed and then followed by the removal of the first masking layer. As will also be described in detail hereinafter, multilayer thin-film magnetic devices having no protective layer may be fabricated by modifying slightly the abovedescribed fabrication method.

In the figures the various layers of the assemblies depicted are not drawn to scale. Certain dimensions are exaggerated in relation to other dimensions in order to present a clearer understanding of the invention.

DETAILED DESCRIPTION OF THE INVENTION

Figure 1:
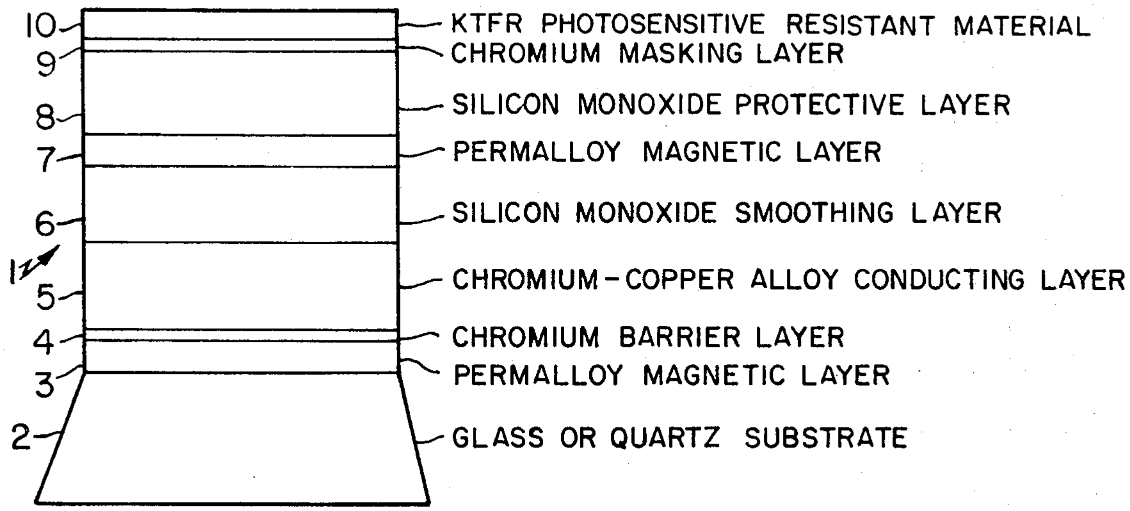
FIG. 1 is a front elevational view of a multilayer assembly produced in accordance with successive deposition steps of a method in accordance with the present invention for fabricating magnetostatically-coupled thin-film magnetic memory devices.

Referring now to FIG. 1, there is shown in a front elevational view a multilayer assembly 1 produced in accordance with a plurality of successive deposition steps of the method of the present invention. As shown in FIG. 1, the multilayer assembly 1 comprises, in succession, a glass or quartz substrate 2; a first Permalloy magnetic layer 3; a chromium barrier layer 4; a chrominum-copper alloy conducting layer 5, for example, a write-sense conducting layer; a silicon monoxide smoothing layer 6; a second Permalloy magnetic layer 7; a silicon monoxide protective layer 8; a chromium masking layer 9; and a photosensitive resistant material masking layer 10.

The multilayer assembly 1 of FIG. 1 is produced in the following manner. A Permalloy material, for example, 60% Ni/40% Fe, is vacuum deposited onto the glass or quartz substrate 2, at a temperature of 280° C., to a thickness of 1000 A. to produce the first Permalloy magnetic layer 3. Chromium metal is then vacuum-deposited onto the first Permalloy magnetic layer 3, to a thickness of 200–500 A., to form the chromium barrier layer 4. The temperature of the assembly during the deposition of the chromium metal is 100° C. As will become more fully apparent hereinafter, the chromium barrier layer 4 acts as a chemical barrier to the etching solution employed to form openings in the superposed layers 5, 6, 7, and 8, thereby preventing the substrate 2 from being undesirable etched by the etching solution.

Next, a chromium-copper melt mixture is vacuum deposited onto the chromium barrier layer, to a thickness of 3000 A., to form the chromium-copper alloy conducting layer 5. The temperature of the assembly during the deposition of the chromium-copper melt mixture is 100° C. A suitable composition for the chromium-copper melt mixture is disclosed in the aforementioned application of Franklin et al., to which reference may be made for details. Silicon monoxide is then vacuum-deposited onto the chromium-copper alloy conducting alyer, to a thickness of approximately 2500 A., to form the silicon monoxide smoothing layer 6. The temperature of the assembly during the deposition of the silicon monoxide is 200° C. The second Permalloy magnetic layer 7 is then formed, on the silicon monoxide smoothing layer 6, to a thickness of 1000 A., by vacuum-depositing Permalloy material, also 60% Ni/40% Fe, at an assembly temperature of 280° C. Silicon monoxide is then vacuum-deposited onto the second Permalloy magnetic layer 7, to a thickness of 2,500 A., to form the silicon monoxide protective layer 8. The temperature of the assembly during the deposition of the silicon monoxide is 100° C. The purpose of the silicon monoxide protective layer 8 will be explained hereinafter.

Next, chromium metal is vacuum-deposited onto the silicon monoxide protective layer 8, to a thickness of 500 A. to form the chromium masking layer 9. The temperature of the assembly during the deposition of the chromium metal is 100° C. As will become fully apparent hereinafter, the chromium masking layer 9 acts as a masking layer much in the same manner as the superposed photosensitive resistant material masking layer 10 but has the advantage of not being attacked by the etching solution employed to form openings in the underlying layers of 8, 7, 6, and 5. Additionally, the chromium masking layer 9 provides a very good surface on which to deposit the photosensitive resistant material masking layer 10, the adherence of photosensitive resistant material to chromium metal being excellent. After the chromium masking layer 9 has been formed, a masking layer of photosensitive resistant material, of the KTFR type, is deposited in conventional fashion on the chromium masking layer 9. The assembly 1 formed in the above described manner is then processed, by means of photomasking and etching operations to produce a plurality of magnetostatically-coupled thin-film magnetic memory devices. The manner in which these devices are produced may be understood by reference to FIGS. 2 through 7.

Figure 2:
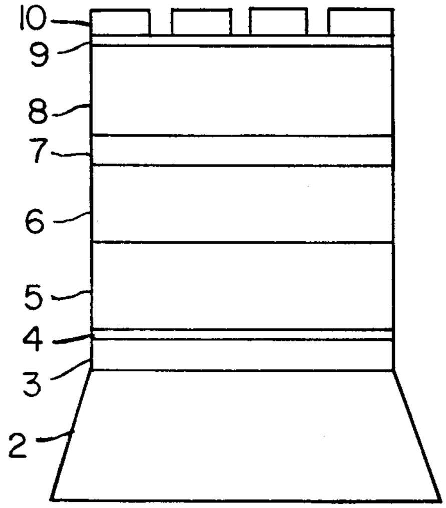
FIGS. 2–8 illustrate the multilayer assembly of FIG. 1 during subsequent successive stages of etching processing in accordance with the method of the invention.

Referring to FIG. 2, a plurality of openings delineating the boundaries of the desired magnetostatically-coupled thin-film magnetic memory devices are initially formed in the layer 10 of the KTFR photosensitive resistant material by well known photosensitive resist photo masking techniques. The assembly of FIG. 2 is then immersed in a potassium ferricyanide-sodium hydroxide etching solution, at room temperature, for approximately one minute to form a plurality of openings in the chromium masking layer 9. The potassium ferricyanide-sodium hydroxide etching solution does not attack the overlying photosensitive resistant material layer 10 or the immediately underlying silicon monoxide protective layer 8. A potassium ferricyanide-sodium hydroxide etching solution which is particularly suitable for use in the present invention comprises one part by volume of a first solution containing one liter of water to 500 grams of reagent grade sodium hydroxide to three parts by volume of a second solution containing three liters of water and 1000 grams of reagent grade potassium ferricyanide. After the openings have been produced in the chromium masking layer 9, the assembly is rinsed in water at room temperature.

Figure 3:
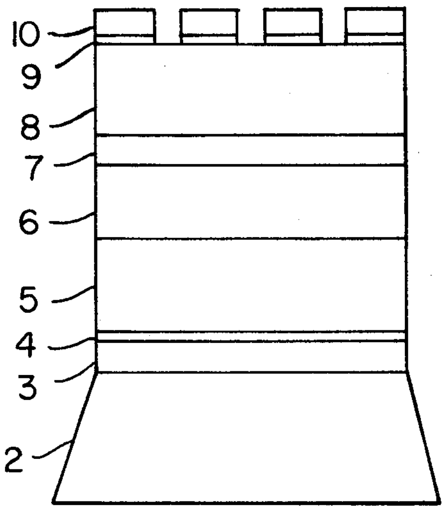
Figure 4:
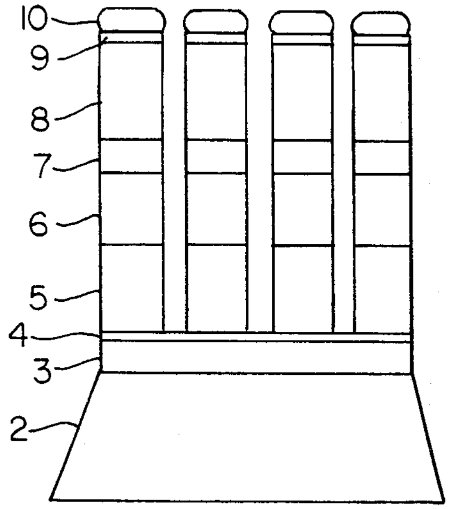

Next, the assembly of FIG. 3 is immersed in a hydrofluoric acid-nitric acid etching solution, at room temperature, for a period of approximately 20 seconds, to successively form openings in the silicon monoxide protective layer 8, the top Permalloy magnetic layer 7, the silicon monoxide smoothing layer 6, and the chromium-copper alloy conducting layer 5. The chromium barrier layer 4 is not etched by the hydrofluoric acid-nitric acid etching solution thereby preventing etching of the underlying Permalloy magnetic layer 3 and, more importantly, the substrate 2. Similiarly, the chromium masking layer 9 is not etched by the hydrofluoric acid-nitric acid etching solution. However, as indicated in FIG. 4, there is some attack of the photosensitive resistant material layer 10 by the hydrofluoric acid-nitric acid etching solution, causing some undercutting of the photosensitive resistant material masking layer 10. A hydrofluoric acid-nitric acid etching solution which is particularly suitable for use in the present invention contains three parts by volume of a 48 percent by weight hydrogen fluoride aqueous solution to one part by volume of concentrated nitric acid. After the openings have been formed in the layers 8, 7, 6, and 5, the assembly of FIG. 4 is rinsed in water at room temperature.

Figure 5:
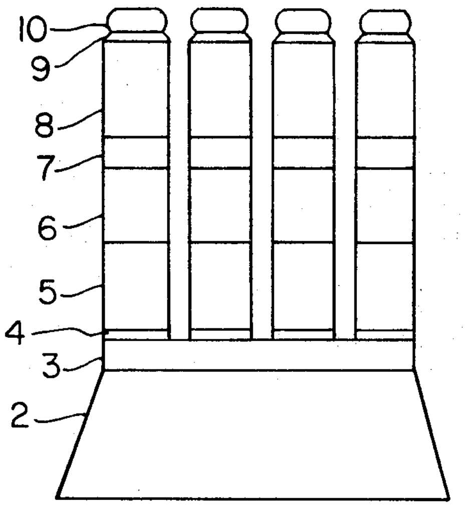

The assembly of FIG. 4 is then immersed in a potassium ferricyanide-sodium hydroxide etching solution, of the same composition as described above, at room temperature, for a period of one minute to form openings in the chromium barrier layer 4, as shown in FIG. 5. The potassium ferricyanide-sodium hydroxide etching solution does not attack the underlying bottom Permalloy magnetic layer 3 or the overlying layers 5, 6, 7, 8, and 10. There is some minor etching of the edges of the chromium masking layer 9 but since the chromium masking layer is removed in a later step, as will be described, this etching of the chromium masking layer is not significant. After the openings have been formed in the chromium barrier layer 4, the assembly is rinsed in water at room temperature.

Figure 6:
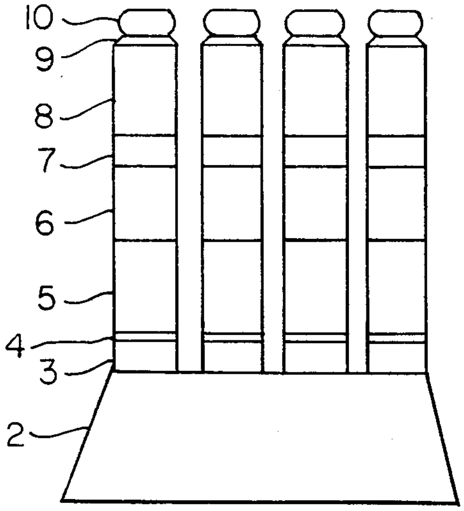

Next, the assembly of FIG. 5 is immersed in a weak aqueous nitric acid solution, at room temperature, for a period of 30 seconds, to form openings in the bottom Permalloy magnetic layer 3, as shown in FIG. 6. The aqueous nitric acid solution does not attack the glass or quartz substrate 2. There is some attack of the edges of the top Permalloy magnetic layer 7 but the extent of this attack is negligible. An aqueous nitric acid solution which is suitable for use in the present invention contains one part by volume of concentrated nitric acid to five parts by volume of water. After the openings have been formed in the bottom Permalloy magnetic layer 3, the assembly is rinsed in water.

Figure 7:
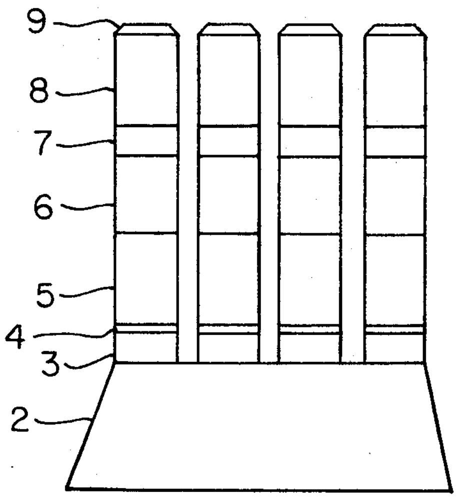

In the next step, which is optional, the photosensitive resistant material masking layer 10 may be removed, by conventional techniques, FIG. 7. The chromium masking layer 9 may also be removed as an additional optional step by immersing the assembly in a potassium ferricyanide-sodium hydroxide etching solution, of the same composition as discussed hereinbefore, at room temperature, for a period of one minute. There is some attack of the edges of the chromium barrier layer 4 during this step, but this attack is neglible. The final assembly, shown in FIG. 8, is then rinsed in water at room temperature and dried.

Figure 8:
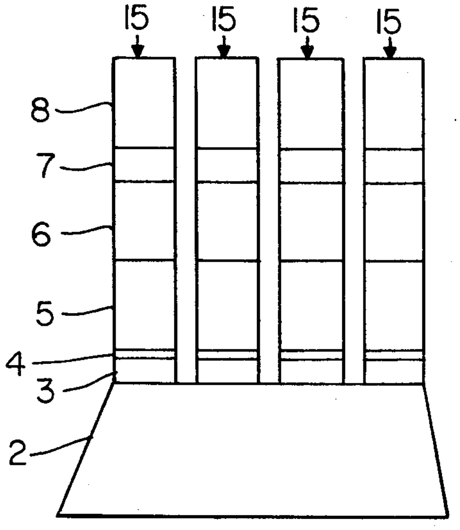

As indicated in FIG. 8, the assembly after completion of the last step includes a plurality of discrete magnetostatically-coupled thin-film magnetic memory devices 15, each including a pair of Permalloy magnetic strips separated by a chromium barrier strip, a chromium-copper alloy conducting strip, and a silicon monoxide smoothing strip. Each device is provided with an overlying silicon monoxide protective strip.

MODIFICATIONS

Although specific preferred values of thicknesses and deposition temperatures have been given hereinbefore in connection with the various layers comprising the specific assembly 1 shown in FIG. 1, it is to be appreciated that the various layers may have other values of thicknesses and deposition temperatures, the values associated with each layer, with the exception of the silicon monoxide smoothing layer, being independent of the other layers. For example, each of the Permalloy magnetic layers 3 and 7 of the assembly 1 of FIG. 1 may have a thickness of 500–2000 A. and be deposited at an assembly temperature of 275–350° C.; the chromium barrier layer 4 may have a thickness of 200–1000 A. and be deposited at an assembly temperature of 20–350 C.; the chromium-copper alloy conducting layer 5 may have a thickness varying from a minimum of 1000 A. to a maximum of 2 microns and be deposited at an assembly temperature of 20–350° C.; the silicon monoxide smoothing layer 6 may have a thickness varying from a minimum of 500 A. (corresponding to a 1000 A. chromium-copper alloy conducting layer) to a maximum of 1.5 microns (corresponding to a 2 micron chromium-copper alloy conducting layer) and be deposited at an assembly temperature of 20–350° C.; the silicon monoxide protective layer 8 may have a thickness of 2000 A. to 2.5 microns and be deposited at an assembly temperature of 20–350° C.; and the chromium masking layer 9 may have a thickness of 200–1000 A. and be deposited at an assembly temperature of 20–350° C.

As another variation of the multilayer assembly 1 of FIG. 1, the silicon monoxide protective layer 8 may be omitted in those situations where the top Permalloy magnetic layer 7 is not exposed to undesirable ambient conditions. It is also possible in some cases to retain the masking layer 10 of photosensitive resistant material and the chromium masking layer 9 on top of the silicon monoxide protective layer 8, or the upper Permalloy magnetic layer 7 if no silicon monoxide protective layer is used, provided the generally irregular appearance of such layers can be tolerated.

While there has been shown and described what is considered a preferred embodiment of the present invention, it will be obvious to those skilled in the art that various changes and modifications may be made therein without departing from the invention as defined by the appended claims.

What is claimed is:

1. A method for fabricating multilayer thin-film magnetic devices comprising the steps of: depositing a first layer of magnetic material on a substrate of glass or quartz; depositing a barrier layer of chromium on the first layer of magnetic material; depositing a layer of copper alloy material on the barrier layer; depositing a layer of smoothing material of silicon oxide on the layer of conducting material; depositing a second layer of magnetic material on the layer of smoothing material; depositing a protective layer of silicon oxide on the second layer of magnetic material; depositing a first masking layer of chromium on the protective layer; providing a second masking layer of photosensitive resist having an opening therein on the first masking layer; subjecting the assembly to etching solution capable of etching the first masking layer of chromium; solution capable of etching the successive layers down to the barrier layer; selectively etching the chromium barrier layer; finally etching the first layer of magnetic material.

2. A method for fabricating multilayer thin-film magnetic devices in accordance with claim 1 wherein: the first layer of magnetic material is of a nickel-iron alloy material; and the second layer of magnetic material is of a nickel-iron alloy material.

3. A method for fabricating multilayer thin-film magnetic devices in accordance with claim 2 wherein:

the etching material for forming an opening in the chromium masking layer is a potassium ferricyanide-sodium hydroxide etching solution;

the etching material for forming openings in the silicon oxide protective layer, the second nickel-iron alloy magnetic layer, the silicon oxide smoothing layer, and the copper alloy layer is a hydrofluoric acid-nitric acid etching solution;

the etching material for forming the opening in the chromium barrier layer is a potassium ferricyanide-sodium hydroxide etching solution; and the etching material for etching an opening in the first nickel-iron alloy magnetic layer is an aqueous nitric acid etching solution.

4. A method for fabricating multilayer thin-film magnetic devices in accordance with claim 3 wherein:

the first nickel-iron alloy layer has a thickness of 1000 A.;

the chromium barrier layer has a thickness of 200–500 A.;

the copper alloy layer has a thickness of 3000 A.;

the silicon oxide smoothing layer has a thickness of 2500 A.;

the second nickel-iron alloy magnetic layer has a thickness of 1000 A.;

the silicon oxide protective layer has a thickness of 2500 A.; and the chromium masking layer has a thickness of 500 A.

5. A method for fabricating multilayer thin-film magnetic devices in accordance with claim 3 wherein:

the first nickel-iron alloy layer has a thickness of 500–2000 A.;

the chromium barrier layer has a thickness of 200–1000 A.;

the copper alloy layer has a thickness of 1000 A. to 2 microns;

the silicon oxide smoothing layer has a thickness of 500 A. to 1.5 microns;

the second nickel-iron alloy magnetic layer has a thickness of 500–2000 A.;

the silicon oxide protective layer has a thickness of 2000 A. to 2.5 microns; and the chromium masking layer has a thickness of 200–1000 A.

References Cited

UNITED STATES PATENTS

| | | | |
|---|---|---|---|
| 3,406,043 | 10/1968 | Balde | 117—212 |
| 3,542,612 | 11/1970 | Cashau | 156—13 |

OTHER REFERENCES

Etching Technique for Use With Positive Resist, Fink et al., p. 964, IBM Disclosure Bulletin, Vol. 9, No. 8, January 1967.

Magnetic Storage Device, Bertelsen, pp. 148 and 149, IBM Tech. Discl. Bulletin, Vol. 8, No. 1, June 1965.

JACOB H. STEINBERG, Primary Examiner

U.S. Cl. X.R.

117—107, 239, 240; 156—11, 13, 17; 340—174